United States Patent Office 3,014,059
Patented Dec. 19, 1961

3,014,059
PREPARATION OF DIALKOXY BORANES
Jack D. Bush, Kansas City, Mo., Richard A. Carpenter, Prairie Village, Kans., and William H. Schechter, Zelienople, Pa., assignors, by direct and mesne assignments, to Callery Chemical Company, Pittsburgh, Pa., a corporation of Pennsylvania
No Drawing. Filed July 6, 1954, Ser. No. 441,636
14 Claims. (Cl. 260—462)

This invention relates to new and useful improvements in processes for preparing dialkoxy boranes, $HB(OR)_2$, and more particularly to a process for preparing a dialkoxy borane by the reaction of a trialkyl borate and a compound of the group consisting of hydrides, borohydrides, and alkoxy substituted borohydrides, of alkali and alkaline earth metals.

Dialkoxy boranes, $HB(OR)_2$, in general and dimethoxy borane, $HB(OCH_3)_2$, in particular are compounds of some considerable importance as intermediates in the preparation of diborane. Dimethoxy borane dissociates into diborane and trimethyl borate according to the equation: $6HB(OCH_3)_2 = B_2H_6 + 4B(OCH_3)_3$. The manufacture of diborane by use of the intermediate compound dimethoxy borane offers a relatively inexpensive source of diborane which does not require the use of expensive boron halides. In the past, dialkoxy boranes such as dimethoxy borane have been prepared by the dissociation of an alkoxyborohydride such as sodium trimethoxy borohydride into dimethoxy borane and sodium methoxide. The production of dimethoxy borane by this process is uncertain and generally produces sodium borohydride and sodium tetramethoxy borate as the principal reaction products. Another process for preparing dimethoxy borane is the reaction of trimethyl borate and diborane. This reaction, however, is merely the reversal of the reaction which is proposed using dimethoxy borane to produce diborane. It is obvious therefore that this process would have little or no utility for making dimethoxy borane unless the dimethoxy borane so manufactured were intended for a purpose other than the production of diborane.

It is therefore one object of this invention to provide a new and improved process for preparing dialkoxy boranes.

Another object of this invention is to provide an improved process for preparing dialkoxy boranes from the reaction of trialkyl borates and metal hydride compounds.

Another object is to provide an improved process for preparing dialkoxy boranes from the reaction of trialkyl borates and compounds of the group consisting of hydrides, borohydrides, and alkoxyborohydrides of alkali and alkaline earth metals.

Another object is to provide an improved process for preparing dialkoxyboranes by distillation of a mixture of a trialkyl borate and a compound of the group consisting of hydrides, borohydrides, and alkoxy borohydrides of alkali and alkaline earth metals.

Another object is to provide a new and improved process for preparing dimethoxy borane.

Another object is to provide an improved process for preparing dimethoxy borane by distillation from a mixture of trimethyl borate and a compound of the group consisting of hydrides, borohydrides, and methoxyborohydrides of alkali and alkaline earth metals.

Other objects will become apparent from time to time throughout the specification and claims as hereinafter related.

This invention comprises the new and improved process for preparing dialkoxy boranes in general and dimethoxy borane in particular which will be described more fully hereinafter and the novelty of which will be particularly pointed out and distinctly claimed.

This invention is based on the discovery that dialkoxy boranes, such as dimethoxy borane, can be produced in substantial yields and in a relatively short time by heating together a mixture of a trialkyl borate, such as trimethyl borate, and a hydride compound of the group consisting of hydrides, borohydrides, and alkoxy substituted borohydrides of alkali and alkaline earth metals, and separating the dialkoxy borane thus formed by any suitable method such as distillation or extraction. In carrying out this reaction a ratio of trialkyl borate to hydride is maintained which favors the formation of a dialkoxy borane and a tetraalkoxy borate according to one of the following equations:

(1) 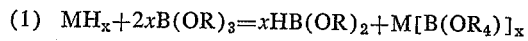

or (2) 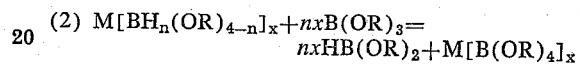

where R is a lower hydrocarbon radical, M is an alkali or alkaline earth metal, $x$ is the valence of M, and $n$ is an integer from 1 to 4.

From the above mentioned reaction it should be especially noted that a proportion of trialkyl borate is always maintained in excess of the amount which favors the formation of the trialkoxy borohydride or borohydride.

In one experiment molten sodium trimethoxyborohydride $NaBH(OCH_3)_3$ was maintained at a temperature of 240 to 250° C. in a glass flask and vapors of trimethyl borate $B(OCH_3)_3$ were bubbled through the molten trimethoxyborohydride at atmospheric pressure. The trimethyl borate vapors which had passed through the molten trimethoxyborohydride were condensed and found upon analysis to contain about 5% by weight of dimethoxy borane $HB(OCH_3)_2$. The dimethoxy borane was identified by specific chemical and physical tests, including the boiling point, active hydrogen analysis, and identification of hydrolysis products. In view of the fact that sodium trimethoxyborohydride is known to dissociate and produce small quantities of dimethoxyborane at elevated temperatures, further tests were run to determine whether or not the trimethyl borate vapors were merely acting as a sweep gas to carry out from the flask any dimethoxy borane which was formed. In these further tests molten trimethoxyborohydride maintained at the same temperature and under the same pressure conditions was swept with dry, oxygen-free, nitrogen gas and no dimethoxy borane was produced.

In another experiment sodium trimethoxy borohydride was dissolved in tetraethylene glycol dimethyl ether, $CH_3O(C_2H_4O)_4CH_3$, and the solution heated to 200 to 230° C. in a glass flask. Trimethyl borate was bubbled through the heated solution for about 2 days and a 35% yield (based on trimethoxyborohydride reacted) of dimethoxy borane was obtained. In another experiment a solution of sodium borohydride in the same solvent and at the same temperature was treated with trimethyl borate under the conditions above mentioned and produced about a 35% yield of dimethoxy borane. Other experiments with solvents indicate that this reaction will proceed satisfactorily in solvents having a boiling point above the boiling point of dimethoxy borane and preferably carried out in the temperature range from about 30° C. to 270° C. with the yields varying slightly in different solvents. The temperature range of 65° to 270° C. has been preferred in most experiments.

In another experiment sodium hydride and trimethyl borate were charged into a distillation pot on top of which there was provided a 4 foot section of a 1½ inch diameter distillation column packed with ⅛ inch Raschig rings. The column was heated to a point at which the pot was maintained at approximately 70° C. and the top of the distillation column was maintained at about 30° C. After maintaining the column at total reflux for about 2 hours a sample of 5 to 6 cc. of pure dimethoxy borane was obtained from the top of the column. A similar experiment was carried out in the same apparatus but using sodium trimethoxy borohydride instead of sodium hydride and a small quantity of pure dimethoxy borane was obtained after a few hours operation at total reflux.

In still another experiment sodium hydride and trimethyl borate were charged into a distillation pot and maintained at total reflux for one day. After this period at total reflux the reflux ratio was set at about 10 to 1 and a 17% concentration of dimethoxy borate in methyl borate was obtained with a yield of dimethoxy borane of about 70%.

In another experiment 0.25 mol of sodium trimethoxy borohydride was charged into the pot of a distillation column with 4 mols of trimethyl borate. A packed distillation column was used having a reflux ratio in excess of 10 to 1 and the distillate was continuously removed. The distillation pot was maintained at a temperature of 65 to 70° C. and the still head temperature was maintained in the range of 25 to 40° C. At the end of the first half hour of distillation the distillate was found to contain about 7% dimethoxy borane.

In another experiment using the apparatus last above mentioned 1 mol of sodium hydride and 5 mols of trimethyl borate were charged into the distillation pot. The pot temperature was maintained at about 68° C. and the still head temperature at about 25° C. At the end of 1 hour of distillation the distillate contained about 37% dimethoxy borane. At the end of four hours of distillation the distillate contained about 67% dimethoxy borane.

In another experiment calcium hydride was reacted with an excess of trimethyl borate to determine the operativeness of this process for hydrides of the alkaline earth metals. The experiment was carried out in a 500 ml. three neck flask surmounted by an eight inch column, 30 mm. in diameter and packed with glass helices. The flask was partially filled with 300 ml. of trimethyl borate and 24.05 g. of calcium hydride of 69% purity was added thereto. The mixture was refluxed for two hours and six samples of product were withdrawn during the next one-half hour period. The samples weighed 0.6 to 0.9 g. each and were analyzed for dimethoxyborane content as determined by active hydrogen analysis. The analysis of the various samples showed them to contain 5.2% to 7.55% dimethoxy borane dissolved in trimethyl borate.

In this and all of the other experiments above noted it should be emphasized that the trimethyl borate which was used was substantially pure and free of methyl alcohol. The trimethyl borate was purified by redistillation and by drying over sodium ribbon. This was found to be necessary because of the fact that any methyl alcohol which might be present as a contaminant in the trimethyl borate would react with the sodium hydride or borohydride and thus reduce the yield from the reaction. It should also be noted that although dimethoxy borane is reported as the principal reaction product there are always small amounts of diborane present due to dissociation of the dimethoxy borane.

It should be noted that the nomenclature used in this application follows the proposed nomenclature submitted by Wartik and Schaeffer to the committee on inorganic nomenclature of the American Chemical Society and tentatively approved by said committee, except that in naming the borohydrides the nomenclature proposed by Schlesinger has been followed.

Although there have been described the best known embodiments of this invention as required by patent laws it is to be understood that within the scope of the claims appended hereto this invention may be practiced otherwise than as specifically described.

Having thus described this invention and the manner in which it is to be performed what we desire to claim and secure by Letters Patent of the United States is:

1. A method of preparing a dialkoxy borane, $HB(OR)_2$, where R is a lower alkyl radical, which comprises reacting a trialkyl borate, $B(OR)_3$, where R is a lower alkyl radical, and a hydride compound of the group consisting of $MH_x$ and $M[BH_n(OR)_{4-n}]_x$, where M is selected from the group consisting of alkali and alkaline earth metals, R is a lower alkyl radical, $x$ is the valence of M, and $n$ is an integer from 1 to 4, in a molar proportion of trialkyl borate to hydride of not less than the stoichiometric amount required to produce dialkoxyborane by heating at a temperature of 30° to 270° C. and continuously removing and recovering the dialkoxy borane as it is formed by subjecting the reaction mixture to distillation.

2. A method according to claim 1 in which the dialkoxy borane is dimethoxy-borane and R is $CH_3$.

3. A method according to claim 2 in which the reaction is carried out in an inert solvent having a boiling point higher than the boiling point of dimethoxy borane.

4. A method according to claim 2 in which the reaction temperature is in the range of 65 to 270° C.

5. A method according to claim 2 in which the hydride compound is refluxed in a substantial stoichiometric excess of trimethyl borate and the dimethoxyborane separated by distillation.

6. A method according to claim 5 in which M is an alkali metal.

7. A method according to claim 5 in which M is an alkaline earth metal.

8. A method according to claim 5 in which the hydride compound is NaH.

9. A method according to claim 5 in which the hydride compound is $NaBH(OCH_3)_3$.

10. A method according to claim 5 in which the hydride compound is $NaBH_4$.

11. A method according to claim 5 in which the hydride compound is calcium hydride.

12. A method of preparing dimethoxy borane, $HB(OCH_3)_2$, which comprises passing trimethyl borate vapor in contact with a compound of the formula $MBH_nOCH_3)_{4-n}$, where M is an alkali metal and $n$ is an integer from 1 to 4, at a temperature of 200 to 270° C., and removing and recovering the dimethoxy borane by distillation as it is formed.

13. A method according to claim 12 in which the compound $MBH_n(OCH_3)_{4-n}$ is dissolved in a suitable solvent having a boiling point above the temperature of the reaction.

14. A method according to claim 13 in which M is sodium.

References Cited in the file of this patent
UNITED STATES PATENTS
2,494,968     Schlesinger et al. _____ Jan. 17, 1950